L. S. GARDNER.
CARBURETER.
APPLICATION FILED MAR. 20, 1915.

1,246,904.

Patented Nov. 20, 1917.
2 SHEETS—SHEET 1.

Witness:
Harry S. Gaither

Inventor:
Levi S. Gardner
by Chamberlin & Frendenreich
Attys

L. S. GARDNER.
CARBURETER.
APPLICATION FILED MAR. 20, 1915.
1,246,904.
Patented Nov. 20, 1917.
2 SHEETS—SHEET 2.
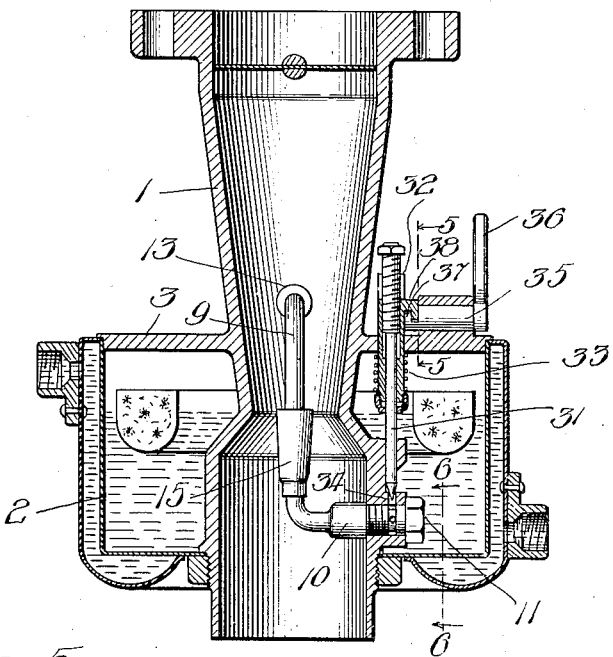
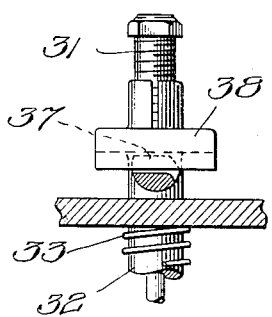
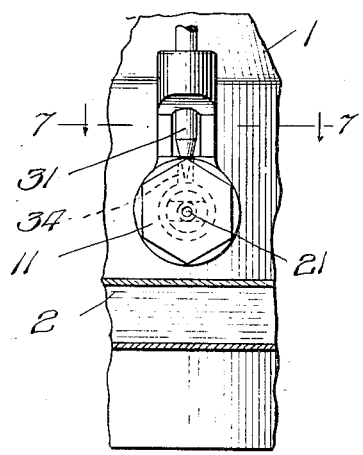
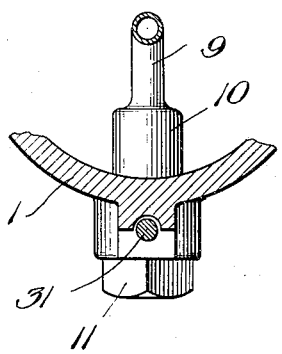
Witness:
Harry S. Gaither
Inventor:
Levi S. Gardner
by Chamberlin & Freudenreich
Attys

UNITED STATES PATENT OFFICE.

LEVI S. GARDNER, OF CEDAR GROVE, LOUISIANA.

CARBURETER.

1,246,904.   Specification of Letters Patent.   Patented Nov. 20, 1917.

Application filed March 20, 1915. Serial No. 15,738.

*To all whom it may concern:*

Be it known that I, LEVI S. GARDNER, a citizen of the United States, residing at Cedar Grove, parish of Caddo, State of Louisiana, have invented a certain new and useful Improvement in Carbureters, and declare the following to be a full, clear, and exact description of the same, such as will enable others skilled in the art to which it pertains to make and use the same, reference being had to the accompanying drawings, which form a part of this specification.

My invention has for its object to produce a carbureter consisting of a few simple parts whose operation shall be efficient and reliable under all working conditions.

Viewed in one of its aspects, my invention may be regarded as having for its object the production of a carbureter adapted, without the use of moving parts, to maintain the most advantageous proportions between the air and fuel at all speeds of the engine to which the carbureter is connected.

Viewed in a further aspect, my invention may be said to have for its object to produce a simple and novel means for manually regulating the flow of fuel in starting or at any other desired time.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Fig. 4 is a view similar to Fig. 1, showing a manual regulating device instead of an automatic regulating device;

Fig. 5 is a section on an enlarged scale on line 5—5 of Fig. 4;

Fig. 6 is a section on an enlarged scale on line 6—6 of Fig. 4; and

Fig. 7 is a section on line 7—7 of Fig. 6.

Viewed in one of its aspects, my invention may be said to consist of a simple modification of the carbureter illustrated in my prior application No. 860,136 of Sept. 4, 1914.

Figure 1:
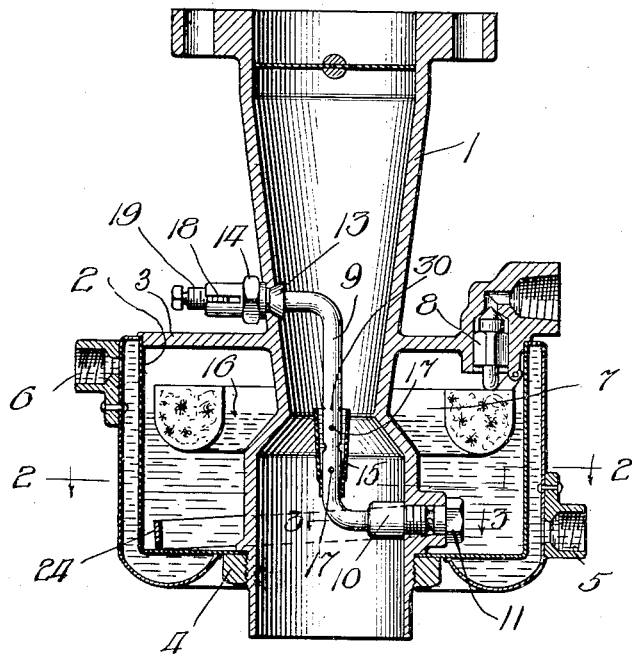
Figure 1 is an axial section through a carbureter arranged in accordance with a preferred form of my invention.
Figure 3:
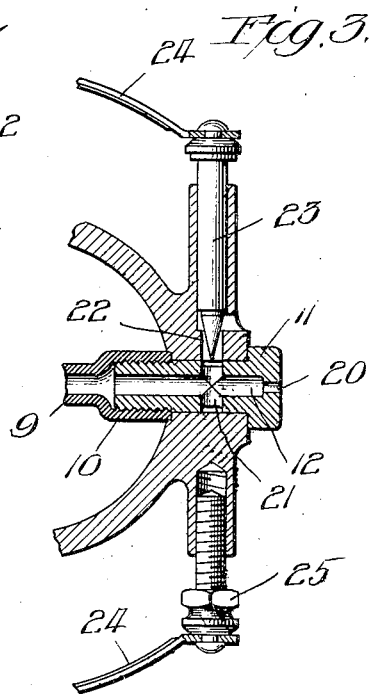
Fig. 3 is a section on an enlarged scale taken on line 3—3 of Fig. 1.
Figure 2:
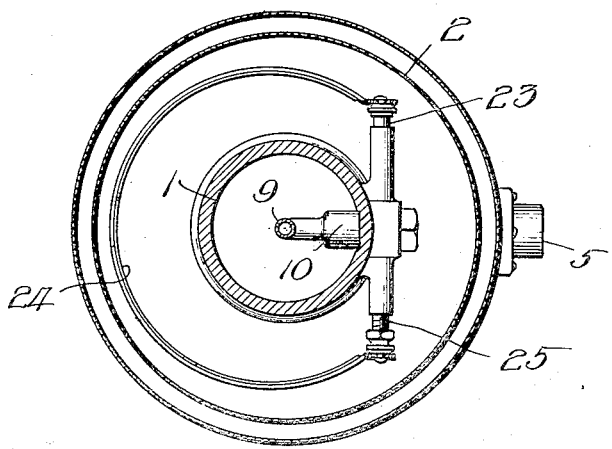
Fig. 2 is a section approximately on line 2—2 of Fig. 1.

Referring to Figs. 1, 2 and 3 of the drawings, 1 represents a tubular member constituting the body of the carbureter, this member being open at both ends. Surrounding the member 1 is a suitable fuel reservoir consisting of a cup or bowl, 2, bearing at its upper edge against and having its mouth closed by an annular flange, 3, formed integral with the body member. The reservoir may be held in place by means of a suitable nut, 4, screwed upon the lower or inlet end of the body member. The walls of the reservoir are made hollow for the reception of a heating medium, suitable inlet and outlet connections, 5 and 6, being provided for permitting a flow of a liquid heating medium through the interior of the hollow walls of the reservoir. In practice the inlet and outlet members 5 and 6 are connected in the circulating line of the cooling system for the engine.

Within the reservoir is the usual float, 7, adapted to control the usual inlet valve, 8, for the fuel.

Arranged axially within the body member 1 is a tube, 9, one end of which communicates with the fuel reservoir while the other end communicates with the outside atmosphere. The details of the connections at the ends of the tube may of course be widely varied. In the arrangement shown, the lower end of the tube is bent laterally and is enlarged as indicated at 10 and into this enlarged portion is screwed a plug, 11, passing through the wall of the body member from a point within and near the bottom of the fuel reservoir. The plug, 11, is provided with an axial opening, 12, extending therethrough. The fuel flows from the reservoir through the plug and into the tube 9. The upper end of the tube 9 is also bent laterally and projects out through the wall of the body member at a point above the reservoir, being open to atmosphere at this end; this portion of the tube being preferably provided with a conical shoulder, 13, for engaging with a complementary bore in the inner surface of the wall of the body member so that a tight joint will be made when a perforated nut or cap, 14, is screwed upon the outer end. The lower part of the straight section of the tube 9 is surrounded by a shell or thimble 15 fitting tightly at its lower end to the tube while its upper end projects to a point very slightly above the liquid level, 16, in the reservoir. The thimble is made slightly larger in diameter than the pipe so as to leave a narrow annular passage between it and the pipe. The thimble may take any desired shape but I prefer to have it larger in diameter at the mouth than at points lower down; one method of accomplishing this end being to taper the thimble gradually from the top to the bottom.

The tube 9 is provided within the thimble with a series of perforations, 17, distributed along the same above the bottom of the thimble.

The body member is preferably in the form of a Venturi tube bearing the same relation to the thimble that the Venturi tube in an ordinary carbureter bears to the nipple. The parts heretofore described constitute my carbureter in its simplest form except that the walls of the reservoir or float chamber need not, in the simplest form, be made hollow, the operation being as follows: The reservoir, the tube 9 and the thimble being filled with liquid fuel to the level indicated by the line 16 and the engine to which the carbureter is attached just starting: the inrushing air through the main air passage produces a partial vacuum at the mouth of the thimble. In other words, the pressure at the middle of the tube is less than at the ends where atmospheric pressure prevails. Consequently liquid fuel will begin to rise from the lower end of the tube and atmospheric air to descend from the upper end, the liquid and the air passing out through the perforations in the tube and leaving the mouth of the thimble together. The proportion between the amount of liquid and amount of air drawn out through the thimble depends upon the cross sectional areas of the effective inlet openings in the ends of the tube 9 relative to each other and also to the effective cross sectional area at the outlet end of the thimble. Consequently, by properly proportioning the inlet ends of the tube and making the outlet perforations of the proper size and distributing them properly, all of which may readily be determined by means of tests for a given size carbureter so as to produce a standard for any desired number of carbureters of the same size, any desired richness of mixture for various speeds of the engine may be obtained under given atmospheric conditions, of course.

If it be desired to provide for adjusting the carbureter to suit different styles of engines, this can conveniently be done by making provision for varying the size of the air inlet end of the tube 9. In the arrangement shown in the drawing this is accomplished as follows: The cap or nut, 14, is provided with one or more slots, 18, extending through the wall thereof from the outer edge. A plug, 19, is screw threaded into the outer end of the cap, closing more or less of the slot or slots, depending upon the distance to which it is screwed into the cap. It is of course evident that in connecting a carbureter to a particular engine, simple caps with different sized inlet openings therein may be tried, thus making a carbureter having a fixed adjustment at the air inlet end of the pipe which will prevent tampering and possible deterioration in the efficiency of the carbureter.

One of the minor difficulties encountered in carbureter practice is the starting of the engine when cold and the question of compensation for temperature changes. One of the features of my invention consists of a simple and novel device for compensating for atmospheric temperature changes. As I have heretofore explained, the water in the cooling system for the engine flows through the hollow walls of the fuel reservoir and, of course, warms the fuel in the reservoir, the water being cold when the engine is cold and being warm or hot when the engine is running, depending on the speed of the engine and the temperature of the atmosphere, these changes in temperature being reflected in the liquid fuel in the reservoir. I utilize these temperature changes by causing them to influence a thermostatic valve in the fuel inlet end of the tube 9, this valve being open when the fuel in the reservoir is cold, thus providing an abnormal effective fuel inlet opening, and closing gradually as the temperature of the fuel increases; until, when a predetermined temperature is reached, the valve will be closed and thereafter the fuel will be admitted only through the normal inlet opening.

In the arrangement shown, the normal fuel inlet opening, 20, in the plug 11 is smaller in diameter than the main passage, 12, and there is a branch passage, 21, in the plug connecting with a port, 22, which opens out into the reservoir. The port 22 is controlled by a needle valve, 23. The outer end of the needle valve is connected to one end of a thermostat, 24, in the form of a bail one end of which carries the needle valve while the other end is anchored to a stationary part, 25, co-axial with the needle valve. The thermostat lies within the liquid in the reservoir and its ends tend to spread apart as the thermostat cools and to approach each other as the temperature of the thermostat increases. The parts are so proportioned that when the temperature of the liquid fuel reaches a predetermined maximum the needle valve will be fully closed; but, when the carbureter is cold and thereafter, until the engine is warmed up, the needle valve will be open more or less. It will be seen that when the needle valve is wholly or partly open, the fuel will flow into the tube 9 more freely than when the valve is closed, because it has two paths to follow in reaching this tube. When the valve is completely closed, only one path, the port 20, remains and the carbureter supplies the minimum amount of fuel for efficient operation of the engine. However, in starting, and until the engine has become warm, an excess of gasolene is supplied. In practice I have found that good results are obtained by setting the thermostat so as to cause the needle valve to close at about 150 degrees F. although I do not mean that this is what might be termed a critical temperature.

The initial adjustment of the needle valve may be varied by making the supporting member, 25, in the form of a screw by the adjustment of which the thermostat and the needle valve are bodily shifted.

While I prefer to use the water in the engine cooling system for heating the carbureter, some of the advantages of my invention may be obtained by utilizing some other supply of heat energy generated by the engine as, for example, the exhaust gases which might be caused to flow through the hollow walls of the carbureter so as to heat the liquid fuel therein.

There is another feature which may be used or not, if desired, that I have illustrated in Fig. 1, namely a series of small perforations, 30, in the tube 9 in the plane of the mouth of the thimble, by means of which there will at all times be a radial discharge of air which will tend to blow the delivered fuel laterally and thus assist in commingling the fuel with the main air currents and thus aiding atomization.

An elaboration of the simple form of my invention, having for its object to give an increased supply of fuel in starting the engine, is illustrated in Figs. 4 to 7. Here instead of the automatic needle valve, 23, I employ a manually controlled needle valve, 31, which may be opened in starting the engine and then be closed so as to reduce the fuel inlet to the tube 9 to a single passage. In the arrangement illustrated, the needle valve is screwed into a sleeve, 32 which extends through and is slidably mounted in the flange 3 forming the top of the reservoir. A spring, 33, surrounding the lower end of the sleeve, 32, tends normally to force the sleeve and the valve down so as to close the port 34 controlled by the valve. On the body of the carbureter, beside the sleeve, 32, is mounted a rock shaft, 35, having on one end an operating arm, 36, and on its other end a cam, 37, which underlies a ledge or flange projecting laterally from the sleeve 32. By swinging the arm 36 in one direction, the cam 37 is caused to lift the sleeve and needle valve, thus uncovering the auxiliary fuel port. The parts are so proportioned that as soon as the operating arm is released, the spring forces the sleeve and needle valve down again.

While I have illustrated and described only a single preferred form of my invention, with slight modifications, I do not desire to be limited to the structural details so illustrated and described but intend to cover all forms and arrangements which come within the terms employed in the definitions of my invention constituting the appended claim.

I claim:

A carbureter having a body member in the form of a Venturi tube, a constant level reservoir adapted to maintain a liquid level in approximately the horizontal plane of the contracted neck of the Venturi tube, a delivery tube of small diameter lying at the axis of the Venturi tube and projecting above and below said plane, the upper end of said delivery tube communicating with the atmosphere outside of the carbureter and the lower end communicating with said reservoir, and a thimble slightly larger in diameter than the diameter of said delivery tube secured upon and about the tube with its upper end in the vicinity of said plane, said delivery tube having small outlet ports in proximity to said plane and below said plane.

In testimony whereof, I sign this specification.

LEVI S. GARDNER.